(12) United States Patent
Zimmanck

(10) Patent No.: US 10,079,557 B2
(45) Date of Patent: Sep. 18, 2018

(54) EFFICIENT RESONANT TOPOLOGY FOR DC-AC INVERSION WITH MINIMAL USE OF HIGH FREQUENCY SWITCHES

(71) Applicant: Enphase Energy, Inc., Petaluma, CA (US)

(72) Inventor: Donald Richard Zimmanck, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 926 days.

(21) Appl. No.: 14/212,082

(22) Filed: Mar. 14, 2014

(65) Prior Publication Data

US 2014/0268898 A1 Sep. 18, 2014

Related U.S. Application Data

(60) Provisional application No. 61/782,079, filed on Mar. 14, 2013.

(51) Int. Cl.
   *H02M 3/335* (2006.01)
   *H02M 7/48* (2007.01)
   *H02M 1/00* (2006.01)

(52) U.S. Cl.
   CPC ........ *H02M 7/4807* (2013.01); *H02M 3/3353* (2013.01); *H02M 3/33576* (2013.01); *H02M 2001/007* (2013.01); *Y02B 70/1433* (2013.01)

(58) Field of Classification Search
   CPC .......... H02M 3/3353; H02M 3/33576; H02M 7/4807; H02M 2001/007
   USPC ..... 363/8, 10, 16, 17, 21.02, 21.03, 37, 123, 363/132, 149, 157, 159, 161, 163–165
   See application file for complete search history.

(56) References Cited

U.S. PATENT DOCUMENTS

| | | | |
|---|---|---|---|
| 3,581,212 A | * | 5/1971 | McMurray ............... G01S 1/72 327/105 |
| 7,796,412 B2 | | 9/2010 | Fornage |
| 8,638,581 B2 | | 1/2014 | Zacharias et al. |

(Continued)

OTHER PUBLICATIONS

Trubitsyn et al., "High-Efficiency Inverter for Photovoltaic Application", Energy Conversion Congress and Exposition (ECCE), 2010 IEEE, pp. 2803,2810, 12-16.*

*Primary Examiner* — Adolf Berhane
*Assistant Examiner* — Afework Demisse
(74) *Attorney, Agent, or Firm* — Moser Taboada

(57) ABSTRACT

System and apparatus for power conversion. In one embodiment, the apparatus comprising a DC stage, comprising a resonant circuit, for generating a high-frequency resonant current; and an AC stage for converting a high-frequency current, generated from the high-frequency resonant current, to an AC output current, wherein the AC stage comprises: a pair of serially-connected switches for (i) passing, during a first half of a cycle of an AC line, a positive portion of the high-frequency current, and (ii) passing, during a second half of the cycle of the AC line, a negative portion of the high-frequency current; and an unfurling bridge for unfurling a current waveform, formed from the positive and the negative portions, to generate the AC output current, wherein the unfurling bridge is operated at a frequency on the order of three orders of magnitude lower than an operating frequency of the serially-connected switches.

20 Claims, 4 Drawing Sheets

(56) References Cited

U.S. PATENT DOCUMENTS

2012/0170341 A1 7/2012 Fornage et al.
2012/0294057 A1 11/2012 Fornage et al.

* cited by examiner

EFFICIENT RESONANT TOPOLOGY FOR DC-AC INVERSION WITH MINIMAL USE OF HIGH FREQUENCY SWITCHES

CROSS-REFERENCE TO RELATED APPLICATIONS

This application claims benefit of U.S. provisional patent application Ser. No. 61/782,079, entitled "Efficient Resonant Topology for DC-AC Inversion with Minimal Use of High Frequency Switches" and filed Mar. 14, 2013, which is herein incorporated in its entirety by reference.

BACKGROUND OF THE INVENTION

Field of the Invention

Embodiments of the invention relate to power conversion, in particular to resonant power conversion.

Description of the Related Art

Resonant converters provide many advantages over other types of power converters, such as low noise, low component stress, low component count, and predictable conduction-dominated losses. Some resonant converters may employ four quadrant (4 Q) bidirectional switches within an AC switching stage in order to handle both the positive and negative voltages required. A fully controlled 4 Q bidirectional switch may be implemented, for example, using two source-connected high-voltage metal-oxide-semiconductor field-effect transistors (MOSFETS).

In some resonant converter topologies employing 4 Q switches, one or more of the MOSFETs within the 4 Q switches may be statically held "on" during the positive half-cycle of the AC waveform while the remaining MOSFETS are actively switched, and other MOSFETs may be statically held "on" during the negative half-cycle of the AC waveform while the remaining MOSFETS are actively switched. Although such an operating technique results in lower gate drive losses than if all of the MOSFETS are actively switched, in resonant converters having high resonant frequencies all of the MOSFETs in the 4 Q switches must still be high-performance, high-frequency switching devices that result in greater switching losses and are more costly than lower-performance, lower-frequency switching devices.

Therefore, there is a need in the art for a method and apparatus for efficiently converting a DC voltage to an AC voltage using a resonant converter.

SUMMARY OF THE INVENTION

Embodiments of the present invention generally relate to a method and apparatus for resonant power conversion substantially as shown and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
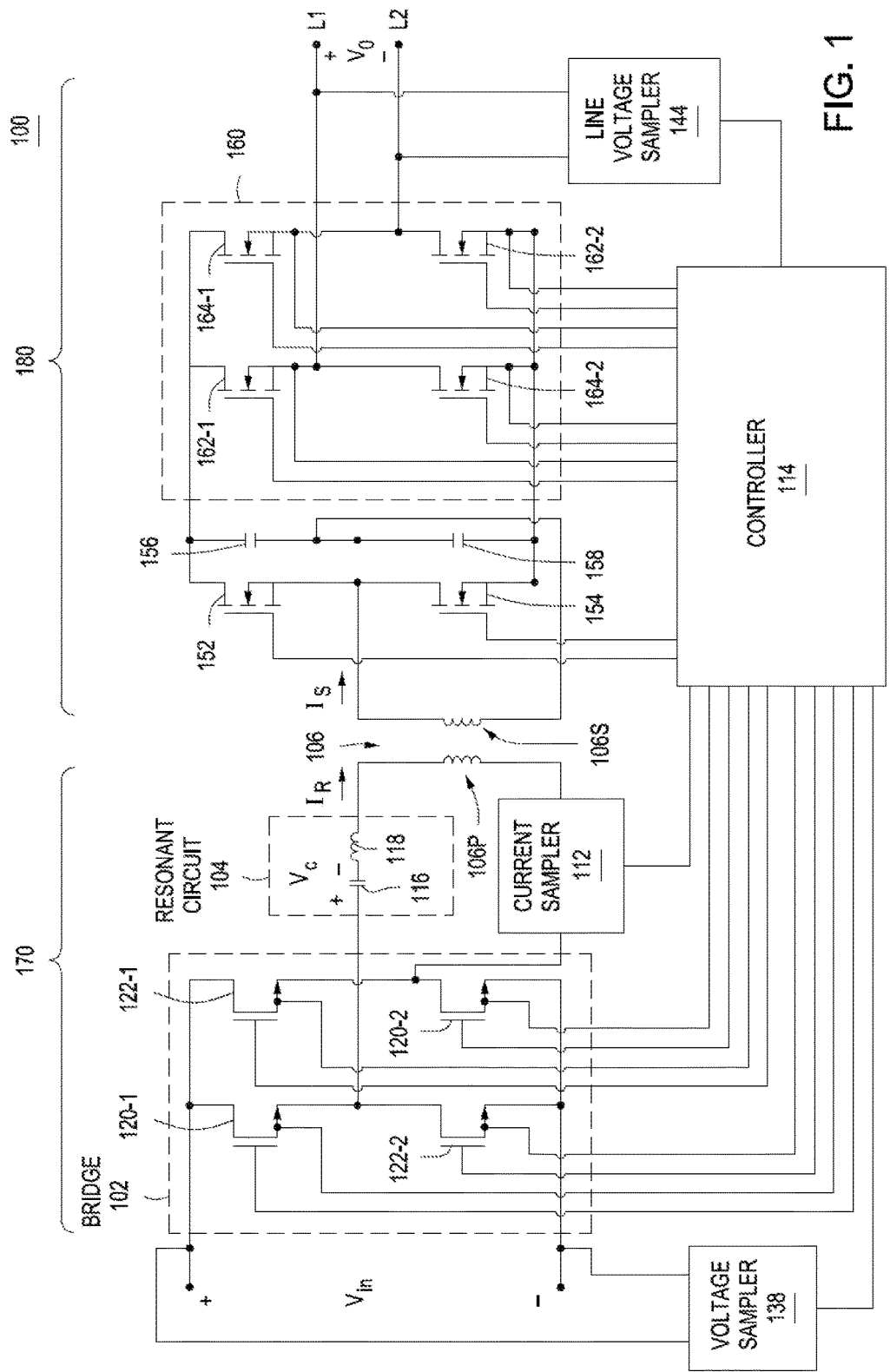
FIG. 1 is a block diagram of a resonant converter in accordance with one or more embodiments of the present invention.

FIG. 1 is a block diagram of a resonant converter 100 in accordance with one or more embodiments of the present invention. This diagram only portrays one variation of the myriad of possible system configurations. The present invention can function in a variety of power generation environments and systems.

The resonant converter 100 comprises a bridge 102 (i.e., an input bridge 102) coupled across a series combination of a capacitor 116, an inductor 118, a primary winding 106P of a transformer 106, and a current sampler 112 (i.e., a DC stage 170). The bridge 102 is a full H-bridge comprising switches 120-1, 120-2, 122-1, and 122-2 (e.g., n-type metal-oxide-semiconductor field-effect transistors, or MOSFETs) arranged such that switches 120-1/120-2 and 122-1/122-2 form first and second diagonals, respectively, of the H-bridge. Gate terminals and source terminals of each of the switches 120-1, 120-2, 122-1, and 122-2 are coupled to a controller 114 for operatively controlling the switches. In other embodiments, the switches 120-1, 120-2, 122-1, and 122-2 may be any other suitable high-frequency electronic switch, such as insulated gate bipolar transistors (IGBTs), bipolar junction transistors (BJTs), p-type MOSFETs, gate turnoff thyristors (GTOs), and the like. The bridge 120 is able to switch, for example, from 60 to 600 volts depending upon the DC voltage source to the bridge 120. In some other embodiments, the bridge 102 may be a half H-bridge rather than a full H-bridge.

A first output terminal of the bridge 102 is coupled between the switches 120-1 and 122-2, and is also coupled to a first terminal of the capacitor 116. A second terminal of the capacitor 116 is coupled to a first terminal of the inductor 118, and a second terminal of the inductor 118 is coupled to a first terminal of the primary winding 106P. The capacitor 116 and the inductor 118 form a series resonant circuit 104 having a frequency on the order of, for example, hundreds of kilohertz (kHz); alternatively, the resonant circuit 104 may have a different resonant frequency.

In some embodiments, the capacitor 116 may be on the order of 400 nanofarad (nF), the inductor 118 may be on the order of 4 microhenries (μH), and the transformer 106 may have a turns ratio of 1:6; such embodiments may have a frequency range of 150 kilohertz (kHz)-300 kHz. In some alternative embodiments, the inductor 118 may represent a leakage inductance of the transformer 106 rather than being a separate inductor, thereby reducing the overall component count of the resonant converter 100. In other alternative embodiments, other types of resonant circuits (e.g., parallel LC, series-parallel LLC, series-parallel LCC, series-parallel LLCC, and the like) may be utilized within the resonant converter 100.

The current sampler 112 is coupled between a second terminal of the primary winding 106P and a second output terminal of the bridge 102, where the second bridge output terminal is coupled between the switches 122-1 and 120-2. Additionally, a voltage sampler 138 is coupled across the input to the bridge 102; both the voltage sampler 138 and the current sampler 112 are coupled to the controller 114. The current sampler 112 samples the current through the primary winding 106P and generates values indicative of the sampled current ("current samples"), while the voltage sampler 138 samples the voltage at the input to the bridge 102 and generates values indicative of the sampled primary side voltage ("primary voltage samples"). The current sampler 112 and the voltage sampler 138 may perform such sampling at rates of 50 MHz; in some embodiments, the current sampler 112 and the voltage sampler 138 each comprise an analog-to-digital converter (ADC) for generating the samples in a digital format. The current sampler 112 and the voltage sampler 138 respectively couple the current and primary voltage samples to the controller 114 for use in controlling the bridge 102.

On the secondary side of the transformer 106 (i.e., an AC stage 180), a first terminal of a secondary winding 106S is coupled to a source terminal of a switch 152 and to a drain terminal of a switch 154. A drain terminal of the switch 152 and a source terminal of the switch 154 are coupled across a series combination of capacitors 156 and 158, as well as across an "unfurling" bridge 160 (which may be referred to as "bridge 160"). A second terminal of the secondary winding 106S is coupled between the capacitors 156 and 158. The switches 152 and 154 are high-performance, high-frequency switches capable of operating at frequencies on the order of the resonant converter frequency (e.g., 150-300 kHz). In some embodiments, the switches 152 and 154 may be n-type MOSFET switches; alternatively, the switches 152 and 154 may be any other type of suitable electronic switch, such as insulated gate bipolar transistors (IGBTs), bipolar junction transistors (BJTs), p-type MOSFETs, gate turnoff thyristors (GTOs), or the like.

The unfurling bridge 160 is a full H-bridge comprising switches 162-1, 162-2, 164-1, and 164-2 arranged such that switches 162-1/162-2 and 164-1/164-2 form first and second diagonals, respectively, of the unfurling bridge 160. Gate terminals and source terminals of each of the switches 162-1, 162-2, 164-1, and 164-2 are coupled to the controller 114 for operatively controlling the switches. A first output line L1 is coupled between the switches 162-1 and 164-2, and a second output line L2 is coupled between switches 164-1 and 162-2. Lines L1 and L2 are coupled to an AC line, such as a single-phase AC commercial grid operating at, for example, 50 Hz, 60 Hz, or the like. The unfurling bridge switches operate at twice the AC line frequency, which is generally much lower than the resonant frequency (for example, three orders of magnitude lower); as such, the switches 162-1, 162-2, 164-1, and 164-2 may be larger, lower-performance, lower frequency switches than the switches 152/154.

A line voltage sampler 144 is coupled across lines L1 and L2 for sampling the AC line voltage, for example at a rate of 30 kilosamples per second (kSPS); in some embodiments, the line voltage sampler 144 comprises an ADC for generating the samples in a digital format. The line voltage sampler 144 couples the AC line voltage samples to the controller 114 for use in generating the output current from the resonant converter 100.

During operation of the converter 100, the bridge 102 receives an input voltage Vin from a DC voltage source, such as one or more renewable energy sources (e.g., photovoltaic (PV) modules, wind farms, hydroelectric systems, or the like), batteries, or any suitable source of DC power (e.g., the resonant converter 100 may be a stage within a multi-stage power converter). The controller 114 alternately activates/deactivates the H-bridge diagonals (i.e., 180° out of phase) to generate a current Ir through the resonant circuit 104 and the primary winding 106P, thereby inducing an alternating current Is in the secondary winding 106S. The transformer 106 may be a step-up transformer for increasing the voltage from the primary to the secondary (e.g., for a DC input generated by a PV module) or, alternatively, a step-down transformer for decreasing the voltage.

The amplitude of the current waveform Is is controlled by the switching frequency of the bridge 102 and can be increased or decreased by suitably adjusting the switching frequency of the bridge 102; i.e., the current (and power) transferred varies as the signal frequency moves away from the resonant frequency of the resonant circuit 104. By raising the frequency above resonance, the effective impedance of the resonant circuit 104 is increased and the power decreases; by lowering the frequency closer to resonance, the resonant circuit effective impedance is decreased and the power increases.

The controller 114 adjusts the switching frequency of the bridge 102 such that the current Is is modulated at twice the AC line frequency. In some embodiments where the resonant converter 100 receives input power from a PV module, the controller 114 may operate the bridge 102 such that the PV module is biased at a maximum power point (MPP) (i.e., the bridge 102 is modulated at twice line frequency to provide the AC current that is injected into the grid; the average power is determined by the MPP algorithm).

The controller 114 drives the switches 152 and 154 at the converter switching frequency (e.g., on the order of hundreds of kHz) and the capacitors 156/158 filter the high-frequency current such that the current waveform coupled to the unfurling bridge 160 is a positive fully-rectified sine wave at twice the AC line frequency. In some other embodiments, one or more inductors may be used in such filtering. The positive rectified sine wave is then unfurled by the bridge 160 to form a true AC waveform, at the AC line frequency, across lines L1 and L2. In some embodiments where the AC line is at 60 Hz, the unfurling bridge 160 operates at 120 Hz to generate the 60 Hz AC output.

Depending on the type of switches used in the unfurling bridge 160, various limitations may be imposed on the resonant converter 100. For example, if the bridge 160 is comprised completely of MOSFETS, the resonant converter 100 can generate reactive power as well as real power; if the bridge 160 is comprised completely of SCRs or is a hybrid SCR/MOSFET bridge, the resonant converter 100 can only generate real power and not reactive power.

By using the combination of the higher-frequency switches 152/154 and the lower-frequency unfurling bridge 160 rather than a topology requiring all high-speed switches on the AC switching side, lower gate-drive losses are achieved and lower-cost switches may be used in the low-frequency bridge 160. Such lower-cost switches may allow a cost savings over other resonant converter topologies that require all high-speed switches on the AC switching side of the converter (e.g., a single high-speed switch, such as a wide-band-gap (WBG) device, may be four-times the cost of a single low-speed switch, such as a silicon device). Additionally, by filtering the high-frequency current through capacitors 156/158 and employing the unfurling bridge 160, the number of devices through which the high-frequency resonant current passes is lower than for other resonant converter topologies that require all high-speed switches on the AC switching side, thereby resulting in lower conduction losses and a higher efficiency.

Figure 2:
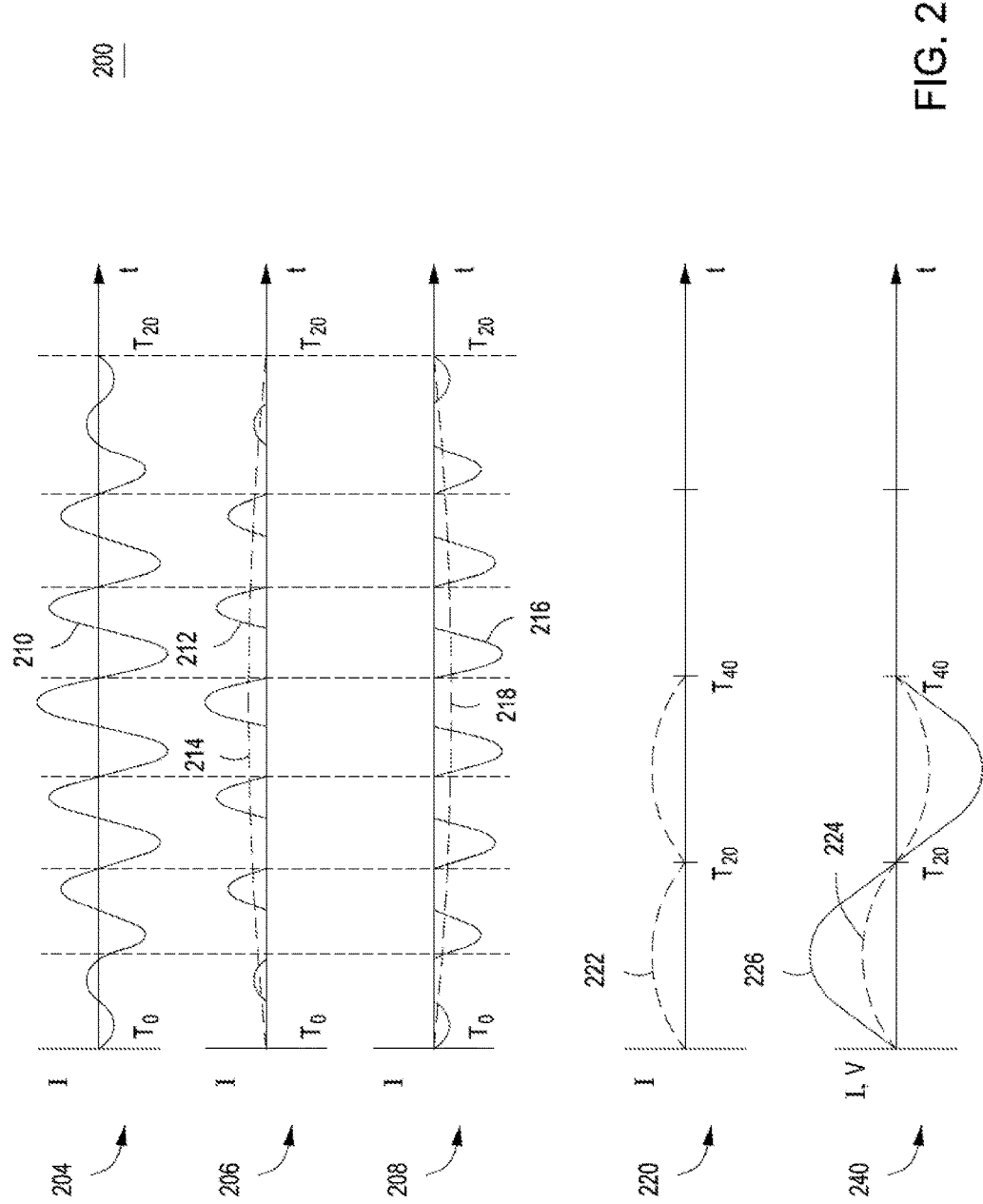
FIG. 2 is a set of graphs depicting various current and voltage waveforms associated with a resonant converter.

FIG. 2 is a set of graphs 200 depicting various current and voltage waveforms associated with the resonant converter 100. The set of graphs 200 comprises graphs 204, 206, 208, 220, and 240.

Graph 204 comprises current waveform 210 depicting the current Is through the secondary winding 106S from time T0 to time T20. The current waveform 210 is a high-frequency (i.e., on the order of hundreds of kHz) sinusoidal waveform modulated at twice the AC line frequency, where twice the AC line frequency may be 120 Hz in some embodiments.

Graph 206 comprises current waveforms 212 and 214. The current waveform 212 depicts the bridge high-side switch current of the resonant converter 100 from time T0 to T20; i.e., the positive portion of the current waveform 210. The current waveform 214 depicts the current filtered by the capacitors 156/158 and injected into the top of the bridge 160 from time T0 to T20.

Graph 208 comprises current waveforms 216 and 218. The current waveform 216 depicts the bridge low-side switch current of the resonant converter 100 from time T0 to T20; i.e., the negative portion of the current waveform 210. The current waveform 218 depicts the current pulled from the bottom of the unfurling bridge 160 from time T0 to T20 (i.e., the unfurling bridge return current).

Graph 220 comprises current waveform 222 depicting the current filtered from capacitors 156/158 and input to the unfurling bridge 160 from time T0 to T40; i.e., the current waveform 222 is an extension of the current waveform 214. The current waveform 222 is a positive fully-rectified sine wave at twice the AC line frequency, having a first full cycle from T0 to T20 (analogous to the current waveform 214), and a second full cycle from T20 to T40.

Graph 240 comprises current waveform 224 and voltage waveform 226. The voltage waveform 226 depicts the AC line voltage on an AC line coupled to output lines L1 and L2 (e.g., a single-phase AC commercial power grid coupled at the output of the resonant converter 100). The voltage waveform 226 is a sinusoidal waveform, e.g., at 60 Hz, having a positive half-cycle from T0 to T20 and a negative half-cycle from T20 to T40. The current waveform 224 depicts the current output from the unfurling bridge 160 onto lines L1 and L2 (i.e., the "unfurled" current waveform 222). The current waveform 224 is a sinusoidal waveform having a positive half-cycle from T0 to T20 and a negative half-cycle from T20 to T40.

Figure 3:
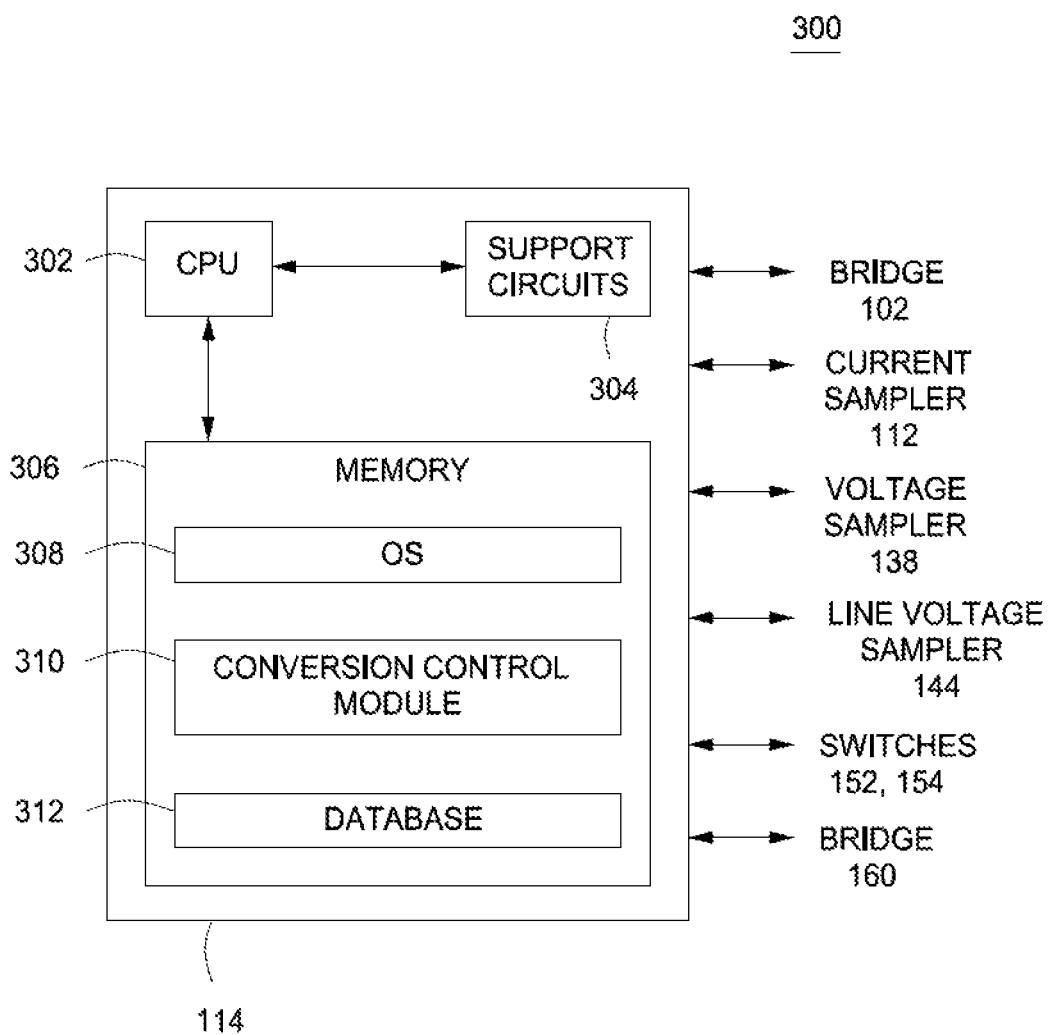
FIG. 3 is a block diagram of a controller in accordance with one or more embodiments of the present invention.

FIG. 3 is a block diagram of a controller 114 in accordance with one or more embodiments of the present invention. The controller 114 may be comprised of hardware, software, or a combination thereof and comprises support circuits 304 and a memory 306, each coupled to a central processing unit (CPU) 302. The CPU 302 may comprise one or more conventionally available processors, microprocessors, microcontrollers and/or combinations thereof configured to execute non-transient software instructions to perform various tasks in accordance with the present invention; alternatively, the CPU 302 may include one or more application specific integrated circuits (ASICs). The support circuits 304 are well known circuits used to promote functionality of the CPU 302. Such circuits include, but are not limited to, a cache, power supplies, clock circuits, buses, input/output (I/O) circuits, and the like. The controller 114 may be implemented using a general purpose computer that, when executing particular software, becomes a specific purpose computer for performing various embodiments of the present invention.

The memory 306 may comprise random access memory, read only memory, removable disk memory, flash memory, and various combinations of these types of memory. The memory 306 is sometimes referred to as main memory and may, in part, be used as cache memory or buffer memory. The memory 306 generally stores the operating system (OS) 308, if necessary, of the controller 114 that can be supported by the CPU capabilities.

The memory 306 may store various forms of application software, such as a conversion control module 310 for controlling operation of the resonant converter 100 as previously described. For example, the controller 114 executes the conversion control module 310 to convert received input power to output power and, in some embodiments where a PV module is coupled at the input of the resonant converter 100, to operate the PV module at its maximum power point (MPP).

The memory 306 may additionally store a database 312 for storing data related to the operation of the resonant converter 100 and/or the present invention.

In one or more other embodiments, the CPU 302 may be a microcontroller comprising internal memory for storing controller firmware that, when executed, provides the controller functionality previously described.

Figure 4:
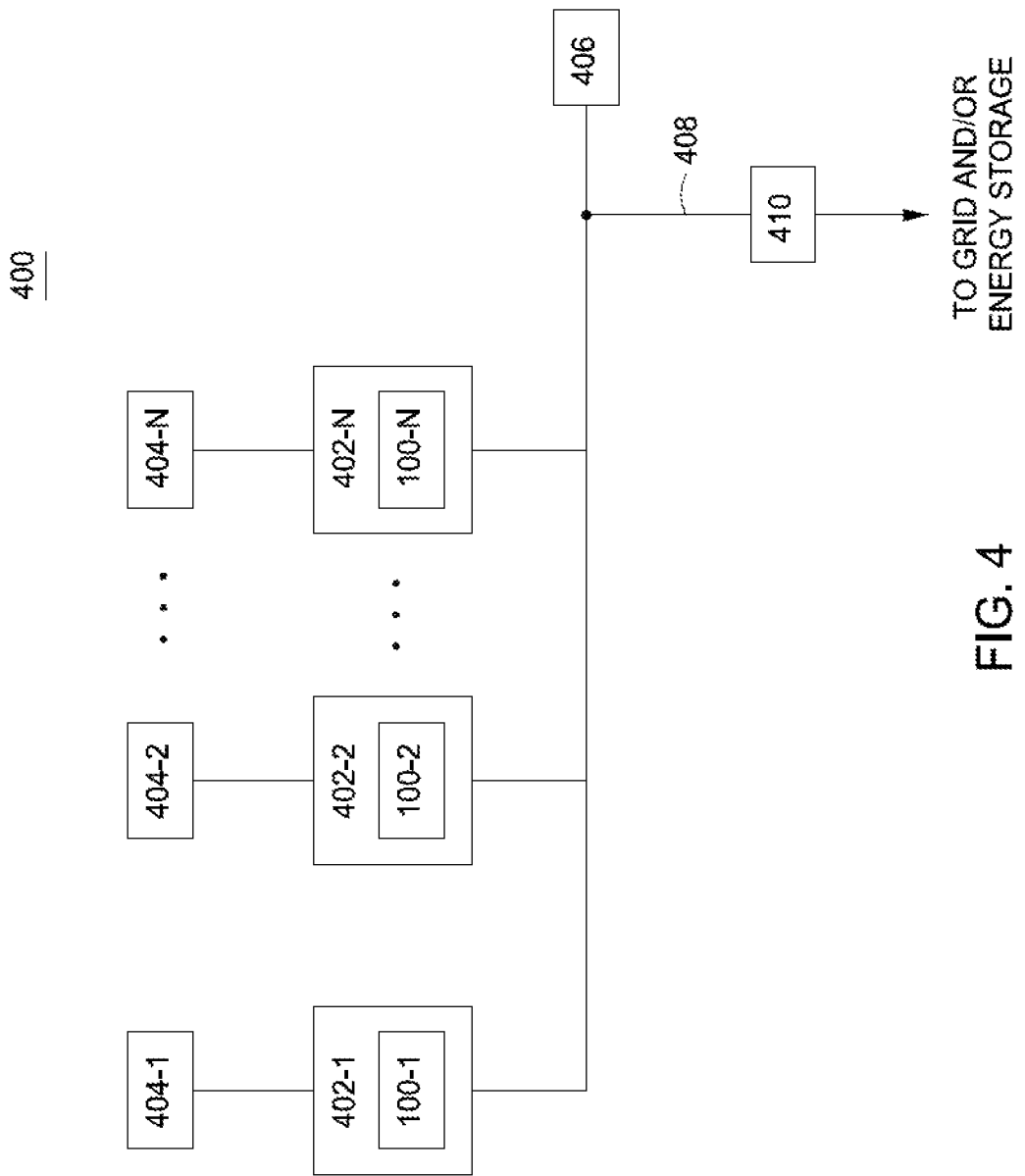
FIG. 4 is a block diagram of a system for power conversion comprising one or more embodiments of the present invention.

FIG. 4 is a block diagram of a system 400 for power conversion comprising one or more embodiments of the present invention. This diagram only portrays one variation of the myriad of possible system configurations and devices that may utilize the present invention. The present invention can be utilized in any system or device requiring a resonant converter.

The system 400 comprises a plurality of power converters 402-1, 402-2 . . . 402-N, collectively referred to as power converters 402; a plurality of DC power sources 404-1, 404-2 . . . 404-N, collectively referred to as DC power sources 404; a system controller 406; a bus 408; and a load center 410. The DC power sources 404 may be any suitable DC source, such as an output from a previous power conversion stage, a battery, a renewable energy source (e.g., a solar panel or photovoltaic (PV) module, a wind turbine, a hydroelectric system, or similar renewable energy source), or the like, for providing DC power.

Each power converter 402-1, 402-2 . . . 402-N is coupled to a single DC power source 404-1, 404-2 . . . 404-N, respectively; in some alternative embodiments, multiple DC power sources 404 may be coupled to a single power converter 402, for example a single centralized power converter 402. Each of the power converters 402 comprises a resonant converter 100 (e.g., the power converters 402-1, 402-2 . . . 402-N comprise the resonant converters 100-1, 100-2 . . . 100-N, respectively) utilized during power conversion to generate single-phase AC output power as previously described.

The power converters 402 are coupled to the system controller 406 via the bus 408. The system controller 406 is capable of communicating with the power converters 402 by wireless and/or wired communication (e.g., power line communication) for providing operative control of the power converters 402 and/or receiving data from the power converters 402. The power converters 402 are further coupled to the load center 410 via the bus 408.

The power converters 402 are each capable of converting the received DC power to AC power, although in other embodiments the power converters may receive an AC input and convert the received input to a DC output. The power converters 402 couple the generated output power to the load center 410 via the bus 408. The generated power may then be distributed for use, for example to one or more appliances, and/or the generated energy may be stored for later use, for example using batteries, heated water, hydro pumping, $H_2O$-to-hydrogen conversion, or the like. In some embodiments, the power converters 402 convert the DC input power to AC power that is commercial power grid compliant and couple the AC power to the commercial power grid via the load center 410.

In some alternative embodiments, the power converters 402 may be DC-DC power converters; in other alternative embodiments, the power converters 402 may receive an AC input and be AC-AC converters (e.g., AC-AC matrix converters). In certain embodiments, the system 400 may be a serially connected micro-inverter (SCMI) system, for example with SCMI redundancy management.

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is defined by the claims that follow.

The invention claimed is:

1. An apparatus for power conversion, comprising:
a DC stage, comprising a resonant circuit, for generating a high-frequency resonant current; and
an AC stage for converting a high-frequency current, generated from the high-frequency resonant current, to an AC output current, wherein the AC stage comprises:
a pair of serially-connected switches for (i) passing, during a first half of a cycle of an AC line, a positive portion of the high-frequency current, and (ii) passing, during a second half of the cycle of the AC line, a negative portion of the high-frequency current; and
an unfurling bridge for unfurling a current waveform, formed from the positive and the negative portions, to generate the AC output current, wherein the unfurling bridge is operated at a frequency on the order of three orders of magnitude lower than an operating frequency of the serially-connected switches.

2. The apparatus of claim 1, wherein the serially-connected switches are operated at a converter switching frequency and the unfurling bridge is operated at double a frequency of the AC line.

3. The apparatus of claim 2, wherein the converter switching frequency is on the order of a resonant frequency of the resonant circuit.

4. The apparatus of claim 3, wherein the resonant frequency is on the order of hundreds of kilohertz (kHz) and the frequency of the AC line is on the order of tens of hertz (Hz).

5. The apparatus of claim 2, wherein the frequency of the AC line is 60 hertz (Hz).

6. The apparatus of claim 2, wherein the DC stage comprises an input bridge operating at the converter switching frequency.

7. The apparatus of claim 6, wherein the converter switching frequency is adjusted to modulate the high-frequency current at twice the frequency of the AC line.

8. The apparatus of claim 1, further comprising a filter, coupled across the pair of serially-connected switches, for filtering the positive portion and the negative portion to generate the current waveform, wherein the current waveform is a positive fully-rectified sine wave.

9. The apparatus of claim 1, wherein the positive portion is positive current occurring during each of a plurality of cycles of the high-frequency current, and the negative portion is negative current occurring during each of the plurality of cycles of the high-frequency current.

10. The apparatus of claim 1, wherein the unfurling bridge is comprised of metal-oxide-semiconductor field-effect transistors (MOSFETs) and the AC stage is capable of generating real power and reactive power.

11. The system of claim 1, wherein the unfurling bridge is comprised of metal-oxide-semiconductor field-effect transistors (MOSFETs) and the AC stage is capable of generating real power and reactive power.

12. A system for power conversion, comprising:
a photovoltaic (PV) module; and
an inverter, coupled to the PV module, comprising:
a DC stage, comprising a resonant circuit, for generating a high-frequency resonant current; and
an AC stage for converting a high-frequency current, generated from the high-frequency resonant current, to an AC output current, wherein the AC stage comprises:
a pair of serially-connected switches for (i) passing, during a first half of a cycle of an AC line, a positive portion of the high-frequency current, and (ii) passing, during a second half of the cycle of the AC line, a negative portion of the high-frequency current; and
an unfurling bridge for unfurling a current waveform, formed from the positive and the negative portions, to generate the AC output current, wherein the unfurling bridge is operated at a frequency on the order of three orders of magnitude lower than an operating frequency of the serially-connected switches.

13. The system of claim 12, wherein the serially-connected switches are operated at a converter switching frequency and the unfurling bridge is operated at double a frequency of the AC line.

14. The system of claim 13, wherein the converter switching frequency is on the order of a resonant frequency of the resonant circuit.

15. The system of claim 14, wherein the resonant frequency is on the order of hundreds of kilohertz (kHz) and the frequency of the AC line is on the order of tens of hertz (Hz).

16. The system of claim 13, wherein the frequency of the AC line is 60 hertz (Hz).

17. The system of claim 13, wherein the DC stage comprises an input bridge operating at the converter switching frequency.

18. The system of claim 17, wherein the converter switching frequency is adjusted to modulate the high-frequency current at twice the frequency of the AC line.

19. The system of claim 12, further comprising a filter, coupled across the pair of serially-connected switches, for filtering the positive portion and the negative portion to generate the current waveform, wherein the current waveform is a positive fully-rectified sine wave.

20. The system of claim 11, wherein the positive portion is positive current occurring during each of a plurality of cycles of the high-frequency current, and the negative portion is negative current occurring during each of the plurality of cycles of the high-frequency current.

* * * * *